June 18, 1957     L. SZILARD     2,796,396
METHOD OF INTERMITTENTLY OPERATING A NEUTRONIC REACTOR
Filed April 16, 1946
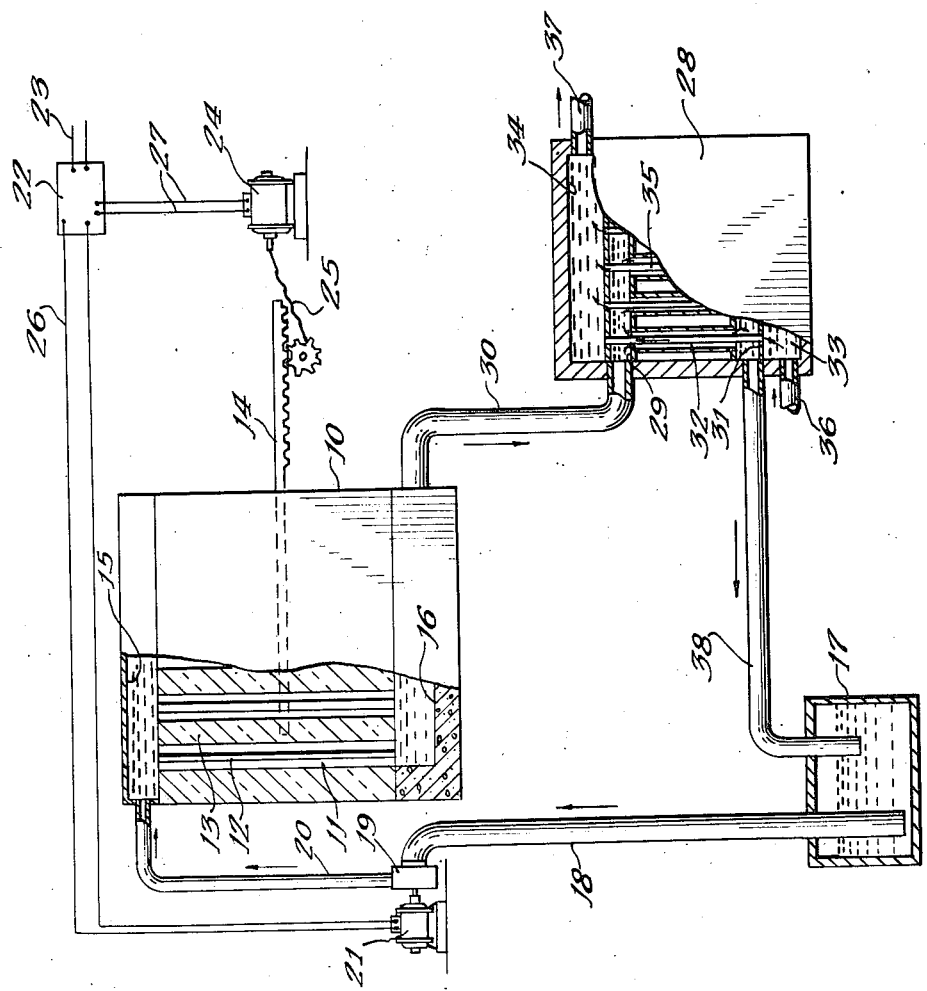
Witnesses:
Henry W. Johnson
Estill E. Ezell
Inventor:
Leo Szilard
By Robert A. ...
Attorney United States Patent Office 2,796,396
Patented June 18, 1957

2,796,396

METHOD OF INTERMITTENTLY OPERATING A NEUTRONIC REACTOR

Leo Szilard, Chicago, Ill., assignor to the United States of America as represented by the United States Atomic Energy Commission Application April 16, 1946, Serial No. 662,512

2 Claims. (Cl. 204—154)

This invention relates to neutronic reactors and more particularly to a method and apparatus for removing heat from a neutronic reactor in a form to convert a fluid into a vapor to produce power in a useful form.

In neutronic reactors, a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in U. S. Patent No. 2,708,656 of Enrico Fermi and Leo Szilard, dated May 17, 1955.

In a fluid cooled reactor only certain coolants in certain amounts can be present at any one time because the neutron absorption of the coolant cannot exceed a predetermined maximum or the chain reaction will not take place. For this reason heat abstraction is limited. However, if the reactor is operated without coolant therein to store heat in the reactor, a coolant of high capture cross section can be passed through the reactor to remove the stored heat. While this is being done, the reaction will cease. If the coolant is then drained from the reactor the reaction can again start. By thus intermittently operating the device, any desired coolant can be used to remove the heat. The present invention is directed toward using a coolant of high neutron cross section passed through the reactor while inoperative to remove heat generated by a previous operation of a self sustaining chain reaction in the device.

Therefore, a principal object of this invention is to utilize in a novel manner reactors similar to those disclosed in the above-mentioned Fermi and Szilard patent by intermittently operating such a reactor and flowing a fluid coolant of high neutron absorption therethrough in heat absorbing relationship, and then passing the coolant in heat exchange relationship with another fluid to vaporize the second fluid to produce power or heat energy in a useful form.

Another object of the invention is to control a neutronic reactor in a novel manner by intermittently flowing a coolant fluid having a high capture cross-section through the reactor in a predetermined cycle.

In the invention herein contemplated to accomplish the above objects, a reactor is used with tubes having large coolant capacity. Preferably, mercury is circulated through the reactor until the uranium temperatures fall to 400° C. The hot mercury is passed to a heat exchanger or steam boiler through which the hot mercury passes slower than through the reactor. The boiler thus operates continuously during intermittent action of the reactor. Steam is produced at a desired temperature-pressure ratio consistent with the mercury heat loss.

Control of the mercury is either by a timer or by a thermostat in the mercury outlet from the reactor. The neutronic reaction starts as the mercury coolant is drained from the reactor. When the uranium rods or other fissionable material within the reactor reach a desired temperature, such as 600° C., a pump starts flooding the reactor with mercury, stopping the neutronic reaction. For further safety, the control rod can be timed for the shut-down operation.

It is thus possible to operate a neutronic reactor on a 50–50 time schedule so that one-half the power of the pile should be available in the form of steam from a heat exchanger in combination therewith, at a usable temperature and pressure. By adjusting the hot mercury flow in the boiler to give hot mercury storage, it is possible to have the steam boiler operate continuously.

Other objects and advantages of the present invention will be more readily understood by reference to the following specification and attached drawing wherein the single figure in the drawing is a schematic view illustrating a neutronic reactor in combination with a heat exchange device wherein the neutronic reactor and heat exchange device are actuated in a predetermined cycle for the heat transfer embodying the teachings of the present invention.

A neutronic reactor 10, preferably of the type in which a coolant is passed therethrough, such as those that are disclosed and claimed in the above-mentioned patent of Enrico Fermi and Leo Szilard, may be used in carrying out the objects of this invention with the exception, however, that it is preferred to modify the usual coolant passages to provide enlarged coolant passages 11 about sheathed uranium rods 12 so that an annular passage approximately .635 cm. across will separate the sheathed uranium rods 12 from the interiors of the tubes forming passages 11. It is preferred to use a graphite moderator although other forms of moderator may be used, such as deuterium oxide or beryllium oxide, depending upon the type of reactor used and the conditions under which it is desired to operate the reactor. The neutronic reaction is controlled by a suitable control rod 14. For the particular structure of the control rod as well as the construction of the safety rods for use with a neutronic reactor of this type, reference is made to the above-mentioned Fermi and Szilard patent.

The neutronic reactor 10 includes a mercury distributing inlet header 15 and a mercury outlet header 16. The mercury inlet header 15 is connected to a cool mercury storage sump 17 through piping 18 connected to a suitable pump 19 which in turn is connected to the mercury distributing inlet headed 15 through piping 20.

The mercury pump 19 is preferably actuated by an electric motor 21 controlled through a timer mechanism 22 operating from a suitable source of electric power 23. Any type of timing mechanism 22 may be used as is well known in the art, and no particular mechanism will be described since this is not necessary for the understanding of this invention. However, the timing mechanism 22 must be such that it may control the motor 21 for the mercury pump 19 in a predetermined cycle or cycles in synchronism with a motor 24 actuating the control rod 14 through suitable control rod mechanism 25. The motors 21 and 24 are connected to the timer through suitable wiring 26 and 27, respectively. Hence, the operation cycle of the reactor 10 broadly includes the steps of permitting the reaction to come to a desired power level and operating thereat until the temperature reaches a predetermined level, as 600° C., stopping the neutronic reaction by substantially simultaneously driving the control rod 14 into the reactor 19 and pumping mercury from the sump 17 into the inlet header 15 and into the reactor 10, absorbing in the mercury the heat of the neutronic reaction until the temperature of the reactor drops to a predetermined level, as 400° C., then discharging the mercury from the neutronic reactor 10 and withdrawing the rod 14 to permit the reaction to again come to operating level.

The heated mercury flows into a heat exchange device in the form of a mercury boiler 28, where the heat is removed, and the cooled mercury is returned to the sump 17.

The mercury boiler 28 preferably comprises a mercury header 29 connected through piping 30 to the mercury outlet header 16 of the neutronic reactor 10. The mercury inlet header 29 is connected to a mercury outlet header 31 through tubing 32. A water inlet header 33 and a steam header 34 are separated from each other by the above-described construction, the water inlet header 33 and the steam header 34 being connected together by tubing 35 extending through the tubing 32 and through the mercury headers 29 and 31, respectively. It is thus obvious that, if water or other vaporizable fluid is discharged through suitable piping 36 into the inlet header 33, the water is vaporized into steam as it passes through the tubing 35 in heat conducting relationship with respect to the mercury in the tubing 32, emerging as substantially saturated steam or super-heated steam depending upon the inlet and outlet temperatures of the mercury. The steam collected in the steam header 34 is then discharged through the steam manifold piping 37, whereupon the steam may be discharged for use in a battery of turbines, reciprocating steam engines or for heating, and/or other uses for steam, as is well understood in the art.

Although a mercury boiler of the type as disclosed may be used, it is within the scope of this invention that other forms of mercury boilers and/or heat exchange devices may be used, as is well understood in the art.

The mercury after passing through the mercury boiler 28 is returned to the cool mercury storage sump 17 through suitable piping 38 whereupon the cycle for the pumping of the mercury may be repeated.

Preferably, the ratio of the capacity of the reactor coolant tubes to the capacity of the mercury boiler tubes is such that continuous generation of steam, or the like, results from the described intermittent operation of the reactor 10. If desired, a storage tank may be provided between the reactor 10 and the mercury boiler 28 for the heated mercury to facilitate continuous steam generation.

The amount of mercury utilized and the temperature range within which the mercury boiler 28 and the neutronic reactor 10 operate is predetermined by the amount of power developed within the reactor and the period of time within which it is desired to control the reactor after the reactor has come up to the predetermined operating temperature. As an example, however, of the conditions of operation, the reactor may be operated to have a maximum temperature of 600° C. within the rods. While passing the mercury in heat conducting relationship with respect to the rods until the temperature within the rods falls to 400° C. With the mercury system, as herein described, it is obvious that mercury may be vaporized in the reactor, if necessary, at temperatures much higher than those set forth above or the mercury may be kept in a liquid state. With a vaporization temperature of the mercury within the neutronic reactor of about 800° F., the pressure of the mercury within the reactor would be 45 pounds per square inch absolute; and, if it is desired to operate at a still higher temperature, for example, of 1000° F., the pressure of the mercury at this vaporization temperature would be 180 pounds per square inch absolute. When mercury is used as a coolant for the reactor within this temperature range, it is quite obvious that as the mercury is discharged into the mercury boiler, the water supplied to and within the mercury boiler and/or heat exchange device is vaporized into steam at fairly high pressures for the operation of steam turbines, and the like.

Although the neutronic reactor has been described as using the control rod as part of the means for stopping the reaction as well as for the control of the reactor, it is also within the scope of this invention that the reaction within the reactor be stopped by the sole use of the mercury and/or fluid which is used as a coolant. This may be accomplished by pumping the mercury into the reactor to stop the reaction in a predetermined cycle, letting the mercury remain within the reactor to absorb the heat of the neutronic reaction, and then discharging the mercury from the reactor whereupon the neutronic reaction will start.

In a neutronic reactor of the type preferred, it is particularly desirable to use a coolant tube construction for the mercury to provide the annular passage surrounding the uranium rods formed from a suitable metal, such as is used and is well known in the construction of mercury boilers, and in addition, the tubes for the mercury should also have the further characteristic of having a low capture cross-action for thermal neutrons as is well understood in the art and explained in the above-mentioned co-pending application. Furthermore, it is desirable to use a metal for the tubes which is not wet by the mercury and with which the metal of the tube does not amalgam.

Although this invention is disclosed primarily as a source of power of large power outputs of from 100,000 to 500,000 kilowatts, when the system is operated for an extended period of time there is a high production output of element $94^{239}$. Therefore, it is within the scope of the invention that the mercury distributing headers, particularly the inlet header shall be constructed in such a manner as to permit the insertion and removal of the uranium rods 12 into and from the moderator of the reactor and at the same time to provide a suitable support for these rods within the reactor.

With a neutronic reactor of the type shown, which may have substantially 2,000 coolant passages in which are placed the uranium rods having a radius of substantially 1.7 centimeters and a thickness of aluminum sheath 0.5 millimeter and a length of 7 meters, it is necessary with a .635 cm. annulus of mercury surrounding each rod to supply substantially 56 tons of mercury to fill the reactor. The passages in the moderator through which the mercury flows have an inside radius of 2.385 cm. Thus, these passages are small enough that, when they are free of liquid mercury, the reactor reactivity may be made substantially greater than unity, and these passages are large enough that, when they are filled with liquid mercury, the reactor reactivity is less than unity. However, it is within the scope of this invention to operate with a lesser amount of mercury and to vaporize the mercury, if necessary, to abstract the heat of the neutronic reaction. The other dimensions of the reactor with regard to the amount of graphite in the moderator and the amount of active uranium in the reactor may follow the dimensions as disclosed in the above-mentioned co-pending application, the critical and operating sizes for the reactor being calculated in accordance with the disclosure in the above-mentioned co-pending application. It is necessary that the reproduction ratio within the reactor shall be such that the exponential rise in density when the control rods are removed from the reactor shall not take place so rapidly that this rise cannot be readily controlled by the control rods. However, if the reactor should get out of control, the mercury can be pumped into the reactor, thus stopping the reaction.

Within the scope of the present invention is the use of a plurality of neutronic reactors 10 connected to the mercury boiler 28 and so operated intermittently that the flow of the coolant through each of the reactors is such as to produce a continuous output of steam from the boiler.

Although this invention has been disclosed utilizing mercury as the preferred coolant, it is within the scope of the invention to use other coolants such as bismuth, and like fluids having high specific heats and which do not vaporize except under conditions wherein the fluids are used at high temperatures. It is preferred to operate the reactor with the coolant as a liquid, and for low temperatures water can be used. However, it is within the scope of this invention that, if desirable, the coolant within the reactor may be vaporized before being discharged into the heat exchange device provided the reaction is shut down during the cooling portion of the cycle.

While this invention has been described as applied to a neutronic reactor structure in which the active portion is cooled by circulating a liquid coolant in heat exchange relationship therewith, it is to be understood that in certain neutronic reactor structures the moderator only may be cooled and also that there may be direct cooling of the uranium alone or of both the uranium and the moderator. Also, it is not desired to limit this invention to a chain reacting system wherein only the active portion of the reactor is directly cooled but it is desired to apply the invention as described and claimed herein to any chain reaction system whether or not otherwise cooled.

It is also to be understood that this invention is equally applicable to other types of reactors including those having liquid moderators, such as deuterium oxide or other reactors constructed in accordance with the general principles described in the above-mentioned copending application, for example, uranium containing greater than usual concentrations of $U^{235}$ may be used. Alternately, the invention may be applied to other fissionable compositions such as $U^{233}$, $94^{239}$, etc., or to combinations of these fissionable isotopes with $U^{238}$ or $Th^{232}$ or similar isotope which yields a fissionable isotope by neutron absorption.

While the theory of the nuclear chain fission mechanism in uranium set forth herein is based on the best presently known experimental evidence, it is not desired to be bound thereby, as additional experimental data later discovered may modify the theory disclosed.

What is claimed is:

1. A method of intermittently operating a neutronic reactor having a plurality of spaced uranium fuel rods, a graphite moderator, passages between the rods and the moderator adapted to the flow of mercury therethrough, the passages being small enough that when free of liquid mercury the reactor reactivity may be made substantially greater than unity and large enough that when the passages are filled with liquid mercury the reactor reactivity is less than unity, said method comprising the steps of instituting a nuclear chain reaction within the reactor, permitting a period of time to elapse until the fuel rods and moderator are heated to substantially above the ambient temperature, then circulating mercury through the passages of the hot reactor thereby heating the mercury and stopping the nuclear chain reaction, then draining the mercury from the reactor whereby the nuclear chain reaction is reinstituted, removing heat from the mercury, and then recirculating the mercury through the said passages to again stop the reaction and transfer heat from the reactor to the mercury.

2. The method of claim 1 for intermittently operating a neutronic reactor having uranium fuel rods of 1.7 cm. radius wherein the passages are annular, coaxial with the fuel rods, and 2.385 cm. inside radius.

References Cited in the file of this patent

UNITED STATES PATENTS 2,708,656   Fermi et al. _____ May 17, 1955

FOREIGN PATENTS 114,150   Australia _____ May 2, 1940
114,151   Australia _____ May 3, 1940
233,011   Switzerland _____ Oct. 2, 1944
861,390   France _____ Oct. 28, 1940

OTHER REFERENCES

Atomic Energy, A Survey, edited by J. Rotblat, published for Atomic Scientists Associated by Taylor and Francis, Ltd., London, 1954. Pages 26, 27.

U. S. Atomic Energy Commission MDDC 893. Factors involved in the production of Atomic Power. Farrington Daniels, April 1, 1947, pages 10, 11.

A Forum Report, Nuclear Reactor Development, from a meeting held under the auspices of "Atomic Industrial Forum, Inc." (edited by Townsend et al.). Pages 16–20. (Meeting held May 24, 1954.)

De Ment et al.: Uranium and Atomic Power, pages 20 and 21 (1941), Chemical Publishing Co., Inc., Brooklyn, N. Y.